3,001,876
PROTEIN-HYDROCOLLOID POWDER AND PROCESS FOR PRODUCING THE SAME
Morrison Loewenstein, Ashton, Ill., assignor to Crest Foods Co., Inc., Ashton, Ill., a corporation of Illinois
No Drawing. Filed Jan. 9, 1959, Ser. No. 785,787
20 Claims. (Cl. 99—20)

This invention relates to a process for the production of a powdered resolubilized milk protein, and more specifically refers to such a process and to the product produced thereby which has improved water-binding capacity and improved suspendibility. The term suspendibility as used herein refers to the property of the protein of being able to maintain itself in a liquid in the form of a uniform suspension such as a colloid which is permanent or at least nearly so. This application is, in large part, a continuation of my copending application Serial No. 715,836, filed February 17, 1958, now abandoned.

Protein concentrates prepared from milk have become important as additives to fortify the protein content of many foods. They have also found use in the pharmaceutical field. One form of the preferred concentrates is generally prepared by simultaneous precipitation from skim milk under acid conditions, the curd thus formed containing about 85% protein in the form of a mixture of casein and lactalbumin, together with a small amount of beta lactoglobulin. This precipitate is sometimes referred to as a casein-lactalbumin fusion or coprecipitate. The lactose and minerals formerly present in the milk are carried off in the whey. The protein is resolubilized.

Another protein concentrate which is improved by the method of this invention, is a milk powder product in which the protein or the casein portion thereof has ben denatured and resolubilized in situ, in the milky liquid before spray drying.

The protein in milk is present as a colloidal suspension. Even the smallest particles are of a sufficient size so that they normally would be separated from the liquid by the force of gravity. However, they are maintained in suspension by an electrostatic charge and to some degree by their absorption of water. When any of these forces are neutralized, a process generally referred to as denaturation, the particles are thrown out of suspension. Once this has occurred, it is extremely difficult to reestablish the forces sufficiently to render the protein once more readily dispersible in an aqueous liquid.

The protein in the state just described, when it no longer possesses an electrostatic charge sufficient to maintain it in a readily dispersible state when it is added to a liquid, may be used in this form for some purposes. However, when the concentrate is to be reconstituted into the form of a suspension again, it must first be subjected to a process known as solubilizing. One such process is described in Patent No. 2,832,685. According to this process, the milk protein coprecipitate produced above is heated after adding first a strong alkali and then ammonium hydroxide. This renders the subsequently dried powder more readily dispersible in an aqueous liquid. Similarly, Patent No. 2,831,771 provides for resolubilizing the proteins in a less rich concentration while still in situ in the liquid where precipitated.

For many uses, a protein content considerably less than 85% is desired. To achieve from the coprecipitate a lower protein concentration, a calculated amount of milk solids not fat (concentrated skim milk or reconstituted dried skim milk or skim milk which has been denatured and resolubilized) may be added, since the protein content of skim milk solids is lower due to the presence of lactose and minerals. The addition of skim milk is performed, preferably, while the solubilized protein is still in the form of a slurry before it has been spray dried. Although the protein concentration adjustment process results in the attainment of the desired protein concentration, the addition of natural protein also results in a material decrease in the overall water-binding capacity of protein. Water-binding capacity is the ability of the concentrate to retain water tied up in such a form that it no longer exhibits the properties associated with water. For instance, if a milk protein concentrate having a low water-binding capacity is used to fortify an ice cream concentrate, when the mix is brought down to a low temperature, the water contained therein will crystallize and cause a very rough consistency in the ice cream. However, when a concentrate having a very high water-binding capacity is used, any water present will be tied up by the concentrate to such a degree that it does not crystallize.

It is an object of this invention to provide a process for the production of a dried milk protein concentrate and the products resulting therefrom wherein the concentrate in its dry finely particulate form has improved water-binding capacity.

It is a further object to provide such a process and the products resulting therefrom, which have improved water-binding capacity even where the protein content may be quite low in value, even down to about 36% or lower by weight of total solids.

It is a further object to provide such a concentrate wherein the water-binding capacity is more uniform than that of prior art milk products of similar protein content.

It is a further object to provide a dry protein concentrate having a high rate of initial dispersibility, and high suspendibility in that it will form a suspension with aqueous liquids which will be maintained over long periods of time.

It is a further object to provide such a dry protein concentrate which has a very bland or natural flavor and odor and which as the result thereof is useful for the fortification of fluid dairy products.

Other objects and advantages will be apparent from the description which follows.

In accordance with the present invention it has been found that if a plant hydrocolloid having high milk reactivity is dispersed into an aqueous slurry of solubilized milk protein concentrate, the resulting product when dry will have greatly improved water-binding capacity, rapid initial dispersibility in aqueous liquids, and suspendibility over extended periods of time. The plant hydrocolloid should be one which has high milk reactivity. The term "high milk reactivity" is a known term in the industry, by use of which plant hydrocolloids having this property can be obtained from suppliers. Milk reactivity is commonly measured in the dairly industry as follows: solutions of a particular plant hydrocolloid, having identical concentrations, are prepared, with both milk and water. If the viscosities of the resulting mixtures are supstantially the same, the hydrocolloid is said to have a low milk reactivity. If the viscosity of the milk solution is substantially higher than that of the water solution, it is an indication of high milk reactivity. Throughout the specification and claims the term "high milk reactivity" will refer to the property measured in this manner.

Among the plant hydrocolloids having high milk reactivity which may be used to practice the present invention are Irish moss, extracts thereof, and alginates such as methyl alginate and sodium alginate and extracts thereof. Among the suitable Irish moss products are those commercially available as "Seachem 14" and "MR–45," which are at present preferred because of having exceptionally high milk reactivity. Other hydrocolloids which have been processed to make them highly milk reactive may also be used, those so far known all being plant hydrocolloids. Potability, which is common in such substances, is a necessary characteristic if ultimate food use is contemplated.

The amount of hydrocolloid which must be added is dependant upon the particular hydrocolloid used, upon the protein concentration of the concentrate, and upon the degree of water-binding capacity desired. It may vary from an amount of as low as about 0.10% to about 10.0% by weight of total protein solids.

According to the invention, the hydrocolloid is added to the milk protein concentrate while the concentrate is in the form of a slurry. It is completely dispersed therein and the resulting mixture subsequently dried. To facilitate the dispersion, the hydrocolloid may be pre-dispersed in water, or, where the protein content is to be adjusted by the addition of skim milk, by the dispersion therein prior to its addition to the solubilized protein slurry. In order to insure that the hydrocolloid will be completely dispersed in the slurry, time must be allowed for the reaction between the hydrocolloid and the solubilized milk solids to be completed. This reaction may be speeded up by elevating the temperature of the mixture. Agitation of the mixture during this process should be reduced to the minimum needed to get adequate dispersion of the particles of the hydrocolloid with the milk protein particles. The mixture is then spray-dried at as low a temperature as is consistent with the attainment of a good product in order not to burn or scorch the product particles.

The example immediately following describes the preparation of a milk protein concentrate according to the method disclosed in U.S. Patent No. 2,623,083.

*Example I.—Coprecipitation*

Into a suitable receptacle such as a conventional cheese vat are placed approximately 5,000 pounds of freshly separated skimmed milk. The titratable acidity as measured in terms of lactic acid is adjusted downwardly to a point where the titratable acidity ranges between .08% and 0.1% by the addition of suitable alkalizing material such as sodium bicarbonate or soda ash, or a combination of the two materials. The milk is then heated to a temperature of 190° to 194° F. The heating is discontinued and the milk brought to a quiescent state. Dilute hydrochloric acid is added to accomplish the complete precipitation of the casein, lactalbumin, and beta lactoglobulin, in the form of a homogenous co-precipitate.

The whey resulting from the process is withdrawn from the vat. The precipitated protein is washed with hot water until substantially a complete removal of lactose and soluble salts from the curd is accomplished. The curd is then pressed free of liquid, either by centrifugal force or in a mechanical press. The curd at this point contains approximately 35% to 40% total solids.

*Example II.—Resolubilizing*

The solubilization, or resolubilization, may be performed, for example, according to the process disclosed in Patent No. 2,832,685.

If a curd such as that produced under Example I containing about 85% protein on dry solids basis is used, it is comminuted, as by passing it through a hammermill. The finely comminuted curd is then placed in a 150 gallon insulated digestion tank. Water is added to the tank contents to give a total volume of about 125 gallons. The tank contents are placed in continuous agitation by means of a large lightning mixer. About 2,200 g. of potassium hydroxide dissolved in several gallons of cold water is slowly added to the curd in the tank. The temperature of the slurry is then raised to about 150° F. by the injection of live steam. Digestion of the alkaline slurry is allowed to continue with vigorous agitation for about four hours, or until gross disintegration of curd particles has been accomplished. The temperature of the slurry is then raised to about 175° F. by direct injection of steam, and the slurry is pumped to a mixing kettle. About 5 pints of ammonium hydroxide (containing 26–28% $NH_3$) are added to the slurry in the kettle, and at least ten minutes are allowed to elapse for the reaction of the alkali with the protein. At this point the resolubilized product may be dried, but, if it is to be used in accordance with this invention as described below, it is more economical to use the slurry, deferring the drying until later.

Instead of starting with a curd resulting from Example I, a dry milk protein concentrate such as the dried product of that curd may be used as a starting material for the process of Example II. Where this is done, water is added to the dry product to produce a slurry and the process then continued in the same manner as in Example II.

The resolubilized concentrate resulting from the process of Example II has a protein content of about 85% based on total solids. Where such a concentration is desired, the hydrocolloid may be incorporated at this point as described in Example IV below. However, where a lower protein concentration is desired, the necessary adjustment may be made as stated in Example III.

*Example II–A.—Resolubilizing in situ*

If the method of Patent No. 2,831,771 is followed, the precipitated protein will be resolubilized in situ—without removal from the skim milk. The precipitation may have been accomplished by heating concentrated skim milk to about 140° F. and adding food grade hydrochloric acid to a pH of about 4.7 to 5.8 depending on the percentage of casein to be precipitated. The acid is added quickly and with only mild initial agitation, unless all of the casein is to be precipitated.

The precipitated proteins are not now removed from the liquid but are resolubilized in situ. To this end ammonium hydroxide is added to provide a pH of about 7.4 to 7.8 and maintained until maximum hydration or resolubilization of the casein is achieved.

*Example III.—Protein adjustment*

The protein concentration of the concentrate produced in Example II above is adjusted by adding to the concentrate in the slurry form a calculated quantity of either concentrated fresh skim milk or reconstituted skim milk, or the product of Example II–A. Since the protein concentration of the resolubilized concentrate produced in Example II is about 85% of the solids and the protein concentration of condensed skimmed milk is ordinarily only from about 34% to about 38% of total solids, any final concentration from about 36% or 40% to about 85% may be obtained by adding the calculated amount of skim milk. The slurry is then reheated to about 175° F. by the direct injection of steam, during which period the skim milk is allowed to react with the highly alkaline slurry produced above in Example II. The slurry is then pumped to a reservoir vat from which it is fed into a commercial spray dryer, or, if it is to be subjected to the present process, the hydrocolloid is added at this point before drying.

The process of the present invention may be carried out either upon the unmodified protein concentrate produced in Example II, or may be combined together with the process described in Example III for adjusting the protein content. The combination with the latter method is described in the following example.

*Example IV.—Main process of present invention*

Approximately 3575 g. of an Irish moss extract are added to and completely dispersed in 100 gal. concentrated skim milk containing 40% total solids. Dispersion is accomplished at a temperature of between 50 and 100° F. A recirculating pump and funnel arrangement are used to provide mechanical means for accomplishing the dispersion. At least 15 minutes' reaction time should be allowed for the hydration of the hydrocolloid in the concentrated skim milk before it is added to the alkaline resolubilized milk protein slurry having 150 pounds of solids on a dry weight basis. After addition, an immediate reaction takes place as evidenced by a large increase in viscosity of the mixture. The temperature is then raised to about 170° F. by the direct injection of steam. Approximately 10–15 minutes are required to attain this temperature, thus allowing the mixture sufficient time to react during that period. Only mild agitation should be used throughout the period. It may be necessary to add water to the mixture during reaction in order to keep the solution sufficiently thin for subsequent spray drying. When the proper temperature has been attained, the mixture is then spray dried in a commercial drier, sufficient care against excessive temperatures being taken to preserve the product's solubility and to prevent any burning of the particles. Temperatures used before this invention may still be used, even though these temperatures, because of the desirably increased water binding capacity, result in a higher water content of the satisfactorily dried powder.

The present process may be carried out directly upon a concentrate such as results from Example IIA above, or the concentrate containing about 85% protein such as is produced in Example II above. In either, the protein readjustment step is dispensed with, and the hydrocolloid may be added directly to the slurry resulting from solubilization. However, it is still preferred to disperse the hydrocolloid in a small amount of skim milk or water as above before adding it to the main body. A dried solubilized milk protein concentrate may also be used as a starting material. It must first, however, be formed into an aqueous slurry and the pH adjusted to a value approximately from about 7.5 to about 9.5 as in Example II. The process may then be carried out as described above.

The products of the present invention are useful for the fortification of liquid dairy products such as skim milk and cream. They may also be used as ice cream stabilizing bases. The product is prepared for use in the form of a finely divided powder. This powder is attained in the dry form by the commercial process known as spray drying which, in one operation, produces a dried finely particulate product having new characteristics. The hydrocolloid is incorporated into the concentrate while both are in a dispersion form, properties being imparted to the concentrate which cannot be acquired by any other method. For example, if it is assumed that a 60% protein concentrate has a water-binding capacity arbitrarily given a value of unity or 1, if a hydrocolloid is dry mixed with the protein, the resulting mixture might have a water-binding capacity of about 1½. However, when exactly the same amount of the same hydrocolloid is incorporated by the method of the invention, that is, reacted with the resolubilized protein in an aqueous slurry, the resulting dried product has a water-binding capacity of approximately 2. The incorporation of the hydrocolloids prior to spray drying, in addition to improving the water binding capacity of the concentrate, also renders it more permanently suspendible in aqueous liquids.

Where more ready dispersibility of the final dried product is desired, the fine particles resulting from spray-drying may be subjected to the process known as "instantizing" which constitutes agglomerating them into grape-like clusters. This allows the subsequent dissolving liquid to seep around individual particles and wet the material more rapidly than is ordinarily possible.

The method of this invention is especially desirable where the final slurry is to be spray dried. Spray drying is the most commonly used method in the industry as it has the advantage of being rapid and relatively inexpensive, yielding a dry, finely powdered material as an end product.

The products of the present invention have a number of advantages over prior art dried protein concentrates. The water-binding capacity of the resolubilized protein is greatly increased. This is especially important where the protein content has been adjusted downward, or the resolubilized protein content is low, since low overall water-binding capacity would then be expected. A suspension prepared from the present concentrates will be maintained in that state for a long period, greater than can be expected to be required for ordinary shelf life. The resulting products are free from objectionable flavor and are stable against bacterial deterioration.

Evidence of the benefits of the enhanced water-binding capacity of the present product may be observed from the resistance of the dried product to bacterial growth. Prior art milk protein concentrates are generally processed to a final water content of less than 4% partly to prevent bacterial growth which is supported by larger water contents. In the case of the protein concentrates made according to the present invention, it has been found that final water contents as high as 4.5 to 5.1% may be used, since the water is so bound up with the protein-hydrocolloid that it is not free to support bacterial growth.

Although the present invention has been described in only several of its forms, and in detail by the use of only one of the palnt hydrocolloids, it is to be understood that any other milk reactive hydrocolloids may be used, and that many variations in all respects may be practiced by those skilled in the art without departing from the spirit or scope of the invention, as is pointed out by the appended claims.

I claim:
1. A process for the production of powder including a milk protein having improved water-binding capacity comprising dispersing a hydrocolloid having high milk reactivity into an aqueous slurry including resolubilized milk protein, and spray drying the resulting mixture.

2. A process according to claim 1 wherein said hydrocolloid is selected from the group consisting of Irish moss, alginates, and extracts thereof.

3. A process according to claim 1 wherein said hydrocolloid is Irish moss.

4. A process according to claim 1 wherein said hydrocolloid is an Irish moss extract.

5. A process according to claim 1 wherein said hydrocolloid is methyl alginate.

6. A process according to claim 1 wherein said hydrocolloid is sodium alginate.

7. A process according to claim 1 wherein said hydrocolloid is an alginate.

8. A process for the production of powder including a milk protein having improved water-binding capacity which comprises dispersing a hydrocolloid having high milk reactivity into an aqueous slurry including a resolubilized milk protein, and treating the resulting mixture to reduce it to a dry, finely particulate form.

9. A process for the production of powder including a milk protein having improved water-binding capacity which comprises forming an aqueous slurry including a resolubilized milk protein and a hydrocolloid having high milk reactivity, and spray drying the resulting mixture.

10. A process for the production of powder including a milk protein having improved water binding capacity which comprises forming an aqueous slurry including a resolubilized milk protein, dispersing a hydrocolloid having high milk reactivity into a small portion of an aqueous liquid, adding the mixture to the slurry, heating the slurry to cause reaction of the ingredients, and spray drying the resulting mixture.

11. A process for the production of powder including a milk protein having a protein content of from about 36% to about 80% by weight based on total solids, and having improved water-binding capacity, which comprises forming an aqueous slurry including resolubilized milk protein, skim milk, and a hydrocolloid having high milk reactivity dispersed in at least a portion of said skim milk, heating the slurry to cause reaction of the ingredients, and spray drying the resulting mixture.

12. A process for the production of powder including a milk protein having improved water-binding capacity which comprises dispersing a hydrocolloid having high milk reactivity into a substantially fat-free aqueous slurry including resolubilized milk protein, and spray drying the resulting mixture.

13. A milk protein in powder form having improved water-binding capacity produced by dispersing a hydrocolloid having high milk reactivity into an aqueous slurry including a resolubilized milk protein, and spray drying the resulting mixture.

14. A milk protein according to claim 13 wherein said hydrocolloid is selected from the group consisting of Irish moss, alginates, and extracts thereof.

15. A milk protein according to claim 13 wherein said hydrocolloid is essentially Irish moss.

16. A milk protein according to claim 13 wherein said hydrocolloid is essentially an Irish moss extract.

17. A milk protein according to claim 13 wherein said hydrocolloid is essentially an alginate.

18. A milk protein according to claim 13 wherein said hydrocolloid is essentially methyl alginate.

19. A milk protein according to claim 13 wherein said hydrocolloid is essentially sodium alginate.

20. A milk protein in powder form having a protein content from about 36% to about 85% by weight based on total solids, and having improved water-binding capacity produced by forming a slurry of resolubilized milk protein, skim milk, and a hydrocolloid having high milk reactivity which has been pre-dispersed in at least a portion of said skim milk, heating the slurry to cause a reaction of the ingredients, and spray drying the resulting mixture.

References Cited in the file of this patent

UNITED STATES PATENTS

| | | |
|---|---|---|
| 1,159,455 | Wieda | Nov. 9, 1915 |
| 2,273,469 | Ingle | Feb. 17, 1942 |
| 2,452,506 | Tritton | Oct. 26, 1948 |
| 2,832,685 | Scott | Apr. 29, 1958 |

FOREIGN PATENTS

| | | |
|---|---|---|
| 701,697 | Great Britain | Dec. 30, 1953 |

OTHER REFERENCES

"How Irish Moss Extractive Improves Protein-Content Foods," by Glade et al., Food Engineering, January 1957, pp. 65–67.